M. MARTIN.

Improvement in Velocipedes.

No. 116,205.                                                  Patented June 20, 1871.

Witnesses.
E. F. Kastenhuber
C. Wahlers

Inventor.
M. Martin

UNITED STATES PATENT OFFICE.

MICHAEL MARTIN, OF NEW YORK, N. Y.

IMPROVEMENT IN VELOCIPEDES.

Specification forming part of Letters Patent No. 116,205, dated June 20, 1871.

*To all whom it may concern:*

Be it known that I, MICHAEL MARTIN, of the city, county, and State of New York, have invented a new and useful Improvement in Velocipedes; and I do hereby declare the follow to be a full, clear, and exact description thereof, which will enable those skilled in the art to make and use the same, reference being had to the accompanying drawing forming part of this specification, in which drawing—

Figure 1:
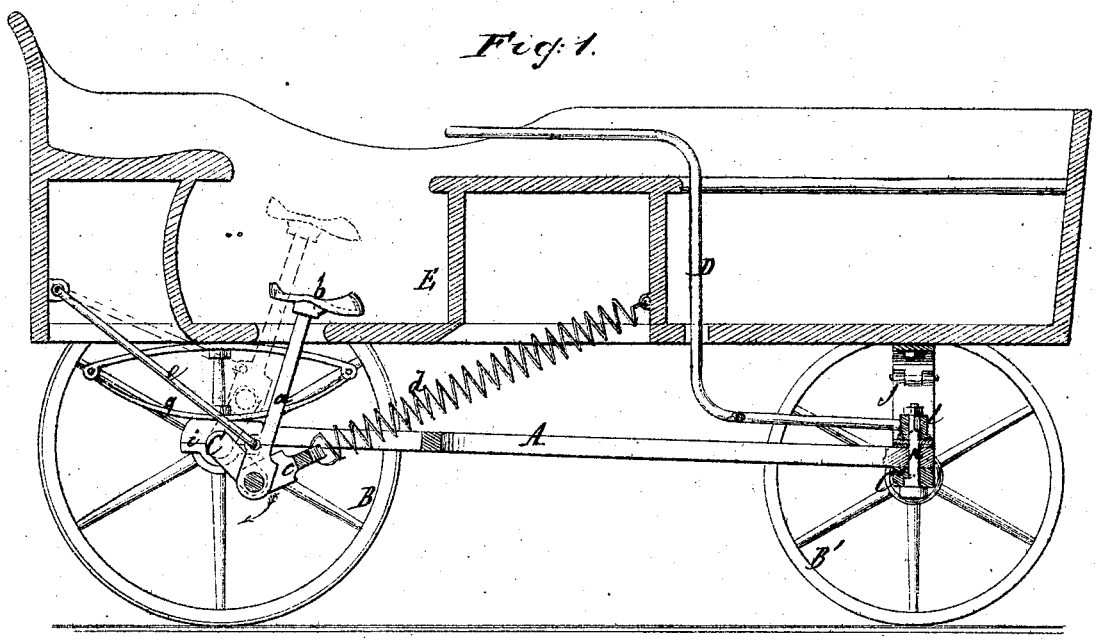
Figure 2:
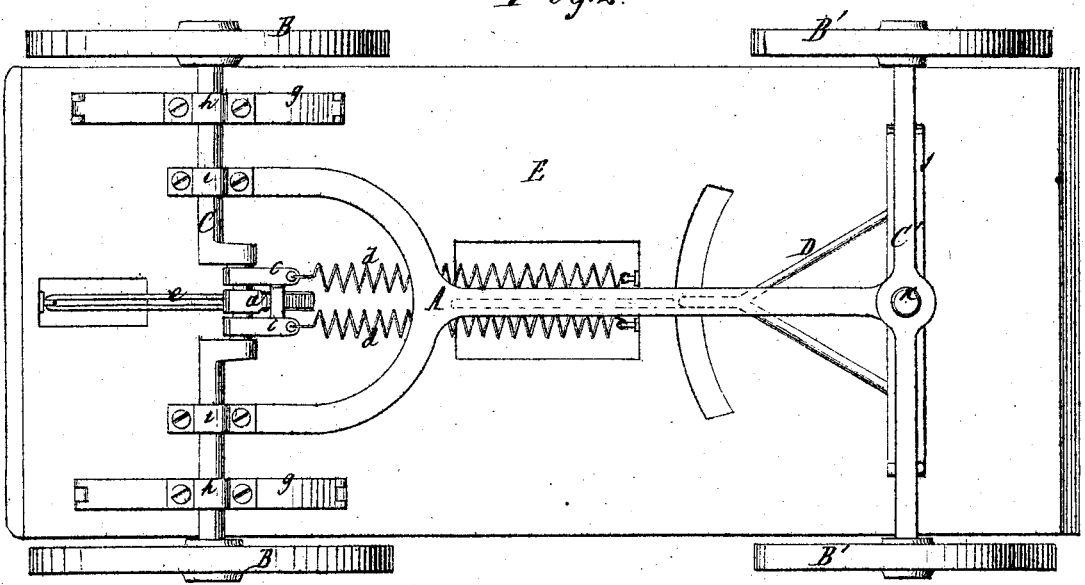

Figure 1 represents a longitudinal vertical section of this invention. Fig. 2 is an inverted plan of the same.

Similar letters indicate corresponding parts.

This invention consists in the arrangement of a propelling-spring, (one or more,) in combination with a crank-shaft carrying the driving-wheels of a velocipede, and with a pedal or foot-piece which is hinged to the crank, and with a spring serving to bring the crank in the most favorable position, in relation to the pedal, in such a manner that, by the action of said springs, the crank is always thrown in the proper relation toward the pedal, and that, by depressing the pedal, nearly half a revolution is imparted to the crank-shaft and its wheels, said shaft being compelled to complete its revolution partly by the momentum of the velocipede and principally by the action of the propelling-spring or springs, while the balance-spring retains the crank, after the same has completed its revolution, in the most advantageous position in relation to the pedal ready to be depressed for the next revolution of the driving-wheels. A single pedal and crank are thus sufficient to propel the velocipede. This invention also relates to the peculiar connection between the axles, the reach, and the box of the velocipede.

In the drawing, the letter A designates the reach, which connects the hind or driving wheels B with the front or steering wheels B'. The driving-wheels are mounted on the ends of a crank-shaft, C, and on this crank is hinged a rod, $a$, which carries the foot-piece or pedal $b$. On said crank is also fitted loosely an arm, $c$, from which extend one or more springs, $d$, to a fixed point of the frame or box of the velocipede; and if the pedal is depressed, the crank turns in the direction of the arrow, marked near it in Fig. 1, and the spring or springs $d$ are extended. When the pedal is depressed with sufficient force, the momentum of the velocipede and its driving-wheels causes the crank to pass its center, and as soon as this takes place the power of the spring or springs causes the crank-shaft to complete its rotation. With the crank or its pedal is further connected a weak spring, $e$, which may be termed the balance-spring, and which serves to retain the crank in the most favorable position in relation to the pedal, so that, by depressing said pedal, nearly half a revolution can be imparted to the crank-shaft, and that the velocipede acquires sufficient momentum to carry the crank beyond its lower dead-center against the action of the propelling-spring or springs. The front axle C' is pivoted to the reach A, and it connects with a steering-bar or tiller, D, extending up to the seat of the rider, so that it can be operated either by hand or foot. One foot may be used to operate the pedal B and the other to operate the tiller D. The box E is connected to the rear axle C by means of springs $g$ and boxes $h$, while the rear end of the reach A is provided with two boxes, $i$, to receive the axle C; and by these means a firm, durable, and yielding connection between the box and the crank is produced. On the front end of the box is secured a spring, $j$, the center of which forms the bearing for the king-bolt $k$, which bolt passes loosely through the front end of the reach, and is fastened at its bottom end in the front axle, while its upper end is square and fitted into a yoke, $l$, that connects with the tiller, so that by turning the tiller the front axle, with its wheels, are turned, while the spring and reach remain stationary, and a yielding and firm connection between the front axle and the box is obtained.

What I claim as new, and desire to secure by Letters Patent, is—

1. The arrangement in a velocipede, with relation to the box E, the crank-axle C, and the pedal-rod $a$, of the loose arm C, coiled spring $d$, and straight spring $e$, as herein set forth and shown, for the purpose specified.

2. The tiller D, spring $j$, and king-bolt $k$, in combination with box E, the front axle C', and reach A, as described.

3. The boxes $h$ and $i$, in combination with the box E, springs $g$, and crank-shaft C, substantially as set forth.

MICHAEL MARTIN.

Witnesses:
W. HAUFF,
E. F. KASTENHUBER.